United States Patent [19]

Gower, II et al.

[11] 4,110,247
[45] Aug. 29, 1978

[54] METHOD OF PREPARING COLLOIDAL SOL OF ANTIMONY OXIDE

[75] Inventors: Reginald Price Gower, II, South Euclid; John Gilbert Richardson, Brook Park, both of Ohio

[73] Assignee: The Harshaw Chemical Company, Cleveland, Ohio

[21] Appl. No.: 785,375

[22] Filed: Apr. 7, 1977

[51] Int. Cl.$^2$ .............................................. B01J 13/00
[52] U.S. Cl. ........................... 252/313 R; 106/15 FP; 252/8.1; 423/88; 423/617
[58] Field of Search .............. 252/313 R; 423/88, 617

[56] References Cited

U.S. PATENT DOCUMENTS

| | | | |
|---|---|---|---|
| 2,727,008 | 12/1955 | Iler | 252/313 S |
| 3,860,523 | 1/1975 | Petrow et al. | 252/313 R X |

FOREIGN PATENT DOCUMENTS 1,144,239  3/1969  United Kingdom ...................... 423/617

OTHER PUBLICATIONS

Sneed et al.: Comprehensive Inorganic Chemistry, vol. 5, Van Nostrand Co., Inc., Princeton, N. J., 1956, pp. 146, 148 & 149.
Rohm & Haas: "Helpful Hints in Ion Exchange Technology", Nov. 1974.

*Primary Examiner*—Richard D. Lovering
*Attorney, Agent, or Firm*—Armand P. Boisselle

[57] ABSTRACT

A method of preparing a colloidal aqueous dispersion of antimony pentoxide from substantially water-insoluble metal antimonate is described. The method comprises contacting an aqueous slurry of the metal antimonate with a cation exchange resin whereby the metal antimonate is converted to the colloidal antimony pentoxide. A preferred method involves passing the slurry of metal antimonate through a fluidized bed containing a cation exchange resin. The colloidal sols obtained in the prescribed manner are useful as flame retardants when combined with halogen compounds.

4 Claims, 1 Drawing Figure

U.S. Patent  Aug. 29, 1978  4,110,247
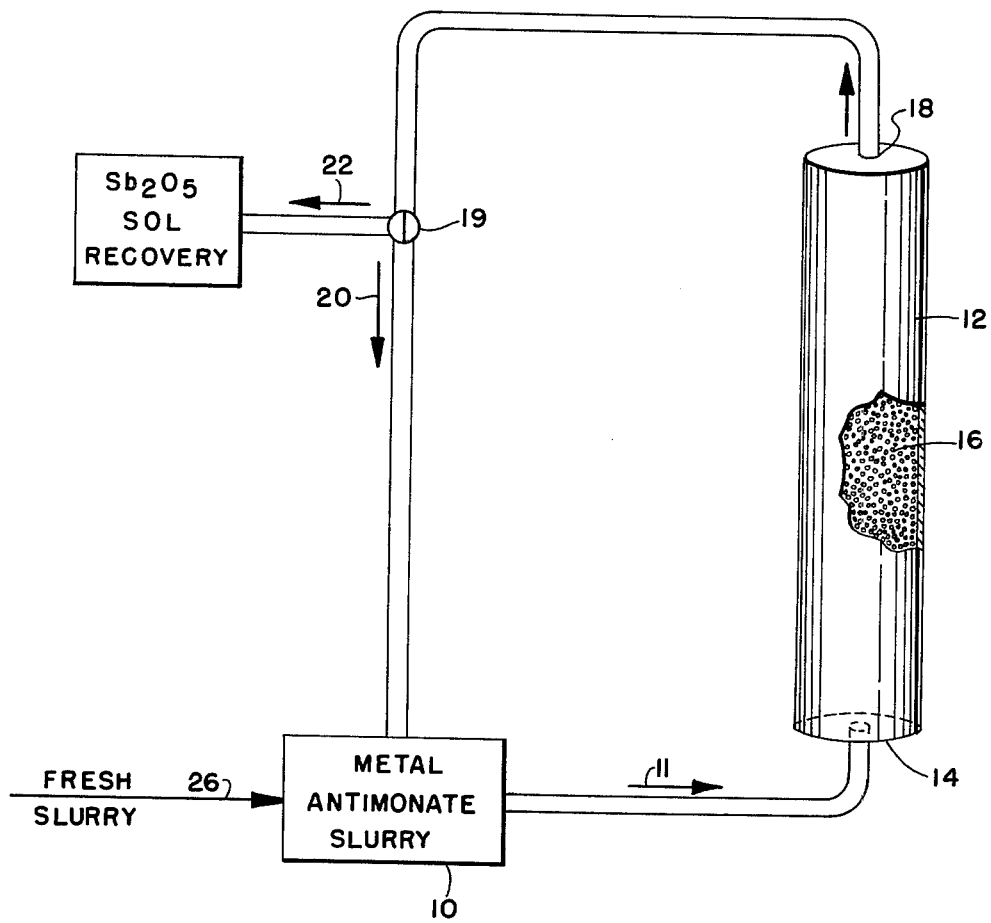

METHOD OF PREPARING COLLOIDAL SOL OF ANTIMONY OXIDE

BACKGROUND OF THE INVENTION

Attempts have been made to incorporated metallic oxides such as antimony oxide into organic polymers, both natural and synthetic, to improve their properties. For example, these oxides have been used to improve the resistance to burning, particularly when employed in conjunction with organic halogen compounds and other halogen-containing materials. While the exact mechanism which results in the flame-retardant properties is not fully understood, it is believed that an antimony oxide halogen compound may be formed in situ which interferes with oxidizing reactions and therefore inhibits burning.

A variety of techniques have been employed to introduce the metal oxides into organic polymers. For example, oxide particles prepared by milling have been suspended in spinning solutions, molding solutions, or polymer melts in attempts to incorporate the oxide in the resulting film, fiber or molded body. The use of this technique generally results in delustering of the polymer due to the scattering of light by the large oxide particles, and the large particles also have relatively low chemical reactivity and a low efficiency as a flame proofing agent. In the case of fibers, the diameter of the oxide particles may approach the diameter of the fibers themselves thereby weakening the bond between the organic polymer and the oxide.

Oxides also have been applied as surface coatings along with a resinous binder. These coating techniques, however, also result in delustering and produce fabrics which have a stiff, harsh hand, poor flexibility and low tear strength.

Additional attempts have been made in the art to avoid some of the deficiencies of the above procedures by using aggregates of oxides prepared as gels, as precipitated powders, and as aggregates prepared by oxidizing the corresponding metallic halides. The use of aggregates, however has resulted in non-uniformity of properties resulting from the difficulties of preparing uniform aggregates and homogenously distributing the aggregates throughout the polymer.

More recently, it has been discovered that antimony oxide prepared as sols of colloidal particles of antimony oxide dispersed in various liquid media is useful. For example, U.S. Pat. No. 3,676,362 describes sols composed of substantially discrete colloidal particles of antimony oxide having an average particle size in the range of about 2 to about 50 millimicrons dispersed in a polar, organic liquid. Such sols can be mixed with a solution of a polymer in a polar organic liquid, and the mixture processed in a conventional manner for making fibers and films. These sols are prepared by reacting a metal halide with water and ammonia in a polar organic liquid. The water converts the halide to antimony oxide in colloidal dispersion and an ammonium salt precipitates.

U.S. Pat. No. 3,860,523 describes the preparation of colloidal antimony oxide sol, preferably in the $Sb_2O_5$ form with an average particle diameter of about 2 to 100 millimicrons. The sol is prepared by first preparing water-soluble potassium antimonate by reacting antimony trioxide with potassium hydroxide and hydrogen peroxide in the ratio of 1 mole to 2.1 moles to 2 moles, and thereafter deionizing the potassium antimonate by passing the solution through a hydrogen form cation exchange resin.

Another method for forming sols of antimony pentoxide is described in U.S. Pat. No. 3,657,179. This patent describes the reaction of antimony trichloride with nitric acid to form a dispersion in a polar organic solvent, and stabilizing the dispersion with an α-hydroxy carboxylic acid. Such dispersions contain from about 0.01 to 5% water by weight.

Another process for preparing colloidal dispersions of antimony pentoxide is described in U.S. Pat. No. 3,994,825, and the process involves mixing particles of antimony trioxide with an aliphatic polyhydroxy alcohol having vicinal hydroxyl groups and contacting said particles with hydrogen peroxide to convert the antimony trioxide to hydrous antimony pentoxide. Reaction preferably is accomplished at a temperature of between 50° and 105° C. The colloidal sol which results is a stable dispersion containing antimony pentoxide with a reported average size of from about 50 Angstroms to about 200 Angstroms.

SUMMARY OF THE INVENTION

This invention relates to a method of preparing a colloidal aqueous sol of antimony pentoxide from a substantially water-insoluble metal antimonate. More particularly, the invention relates to a method which comprises contacting an aqueous slurry of a metal antimonate with a cation exchange resin whereby over 99% of the metal antimonate can be converted to the colloidal antimony pentoxide. Preferably, the aqueous slurry containing the metal antimonate is passed through a fluidized bed containing the cation exchange resin, and the slurry is maintained at a temperature above the freezing point but below the temperature at which polymerization occurs. Stable sols of antimony pentoxide are obtained, and these are useful as flame retardants in polymeric compositions, particularly in combination with halogen-containing compounds.

BRIEF DISCUSSION OF THE DRAWING

The drawing is a schematic flow sheet illustrating one embodiment of the general process of the invention.

DESCRIPTION OF PREFERRED EMBODIMENTS

The present invention relates to a method of preparing colloidal sols of antimony pentoxide from water-insoluble metal antimonates. As mentioned above, colloidal sols of antimony pentoxide have been prepared from potassium antimonate which is water-soluble, and such method has been described in U.S. Pat. No. 3,860,523. We have now discovered that it is possible to prepare stable colloidal aqueous sols of antimony pentoxide from substantially water-insoluble metal antimonates by contacting an aqueous slurry of the metal antimonates with a cation exchange resin. The metal antimonates are believed to be converted initially to antimonic acid which then forms the stable antimony pentoxide sol.

The method of this invention involves preparing a slurry of water-insoluble metal antimonate in water and thereafter contacting the slurry with a cation exchange resin for a period of time which is sufficient to convert the metal antimonate to colloidal antimony pentoxide.

The water-insoluble metal antimonates which are useful in the method of this invention are those antimonates which are generally considered in the art as being water-insoluble even though a small quantity of the material may in fact be soluble in water at various temperatures. For example, hydrated sodium antimonate [NaSb(OH)$_6$] is considered to be a water-insoluble antimonate in the art and in this application since reportedly only 0.03 gram of sodium antimonate is soluble in 100ml. of water at 12.3° C. and 0.3 gram is soluble in 100ml. of water at 100° C. Thus, as used in this specification and in the claims, the term water-insoluble embraces those metal antimonates which are substantially water-insoluble.

Examples of water-insoluble metal antimonates, in addition to the hydrated sodium antimonate, include calcium antimonate, magnesium antimonate, barium antimonate, copper antimonate, etc..

The metal antimonates which are useful in the method of the invention are known and several are commercially available. Alkali metal antimonates have been prepared by fusing antimony, antimony oxide or antimony sulfide with an alkali-metal hydroxide with sodium nitrate, and thereafter separating the antimonate from the other reaction products by extraction.

Water-insoluble metal antimonates can be prepared from water-soluble potassium antimonate by the addition of a metal (in the form of a metal salt) to a solution of the antimonate. The metal will exchange with the potassium ion to form an insoluble metal antimonate which precipitates from the solution. For example, sodium, barium, and copper antimonates can be prepared from potassium antimonate by adding sodium chloride, barium chloride or copper chloride to solutions of potassium antimonate.

Although various methods of preparing water-insoluble metal antimonates have been described above, the source of the metal antimonate utilized in the method of the invention is not critical.

In the first step of the method of this invention, a slurry of the water-insoluble metal antimonate is prepared by mixing the antimonate with the desired amount of water. Generally, the slurry will contain from abut 2 to about 6% by weight of the metal antimonate, and it is preferred that the amount of metal antimonate incorporated into the slurry will be sufficient to provide an antimony pentoxide sol containing about 2% antimony pentoxide. The temperature of the slurry may be at a temperature above the freezing point but below the temperature at which polymerization occurs. Room temperature generally is satisfactory.

Any acid form of cation exchange resin can be utilized in the method of the invention. The ion exchange resins are commercially available and may be used as obtained or pretreated with acid solutions such as 1% by volume hydrochloric acid to insure that the resin is in the hydrogen ion form. Examples of commercially available acid form cation exchange resins include "Dowex-50" (available from the Dow Chemical Company) and "Amberlite-120" (available from Rohm and Haas). Any of the zeolite resins disclosed in U.S. Pat. No. 2,244,325 also may be used.

In the method of the invention, the slurry is brought into contact with an amount of the cation exchange resin which is sufficient to provide the necessary quantity of hydrogen ions for exchange with the metal ions of the metal antimonate. Moreover, the slurry should be in contact with the ion exchange resin for a period of time which is sufficient to accomplish the desired ion exchange and to provide the desired conversion of the metal antimonates to the desired antimony pentoxide. The substantial completion of the ion exchange is indicated by a significant drop in the pH of the mixture to a final pH of about 2 to 1.5, and the formation of a nearly clear solution when the insoluble metal antimonate is converted to the antimony pentoxide sol. When the ion exchange reaction is completed, a substantially clear solution is recovered from the ion exchange resin and any solids which may be present are removed by filtration.

A preferred method of preparing the antimony pentoxide sols of the invention utilizes an ion exchange resin column, and the slurry is circulated through the resin bed from the bottom to the top at a velocity which is sufficient to fluidize the resin bed without forcing substantial portions of the resin out of the column. This embodiment is illustrated in the drawing which will now be described. A prepared metal antimonate slurry is pumped from a storage container shown as 10 via arrow 11 to the bottom 14 of exchange resin column 12 and exits column 12 at the top as shown at 18. Column 12 contains the cation exchange resin particles 16.

The liquid mixture which is removed from the ion exchange column at 18 may be recirculated through the column as shown by arrows 20 and 11. The recirculated material may be combined with fresh slurry supplied to container 10 as indicated by arrow 26. Alternatively, when the ion exchange reaction is considered complete, the aqueous mixture containing the antimony pentoxide sol may be recovered as shown at arrow 22 by proper manipulation of valve 19. In practice, the slurry mixture is recirculated through the ion exchange column 12 until aqueous slurry is converted to a substantially clear liquid and the pH of the liquid has been reduced to about 2 or less.

Upon standing for several hours, the initially clear or faintly opalescent solution recovered at arrow 22 becomes an opaque colloidal dispersion of antimony pentoxide. Although the mechanism of the reactions of this invention have not been investigated, it is believed that metal ions are exchanged for hydrogen ions in the resin. As the small amounts of metal ions are removed from the solution, dissolution of the metal antimonate continues until essentially all of the antimony is in solution as antimonic acid. Antimonic acid eventually polymerizes to form antimony pentoxide.

The following example will illustrate the method of the invention for preparing colloidal sols. Unless otherwise indicated, all parts and percentages are by weight.

The slurry of 47.5 grams of sodium antimonate in 800ml. of deionized water is prepared. The slurry is pumped through an ion exchange column containing 700ml. of deionized water and 300ml. of Amberlite IR-120 (H) resin (a hydrogen form cation exchange resin available from Rohm and Haas) at a rate of about 8.4gpm/ft$^2$ and which is sufficient to fluidize the resin bed. The sodium antimonate slurry is recirculated through the column, and the pH is monitored continuously. After about 15 minutes (3 cycles), the pH of the slurry drops from a pH of 8 to a pH of 2. Recirculation of the mixture for an additional 45 minutes reduced the pH to 1.76. At this time, the solution was recovered and filtered to remove a small amount of a light-brown colored substance. Upon standing overnight, the resulting clear solution became opaque.

Analysis of the colloidal dispersion prepared in this manner indicated the dispersion contained about 2% antimony pentoxide and only 0.016% sodium. This amount of sodium indicates that approximately 95% of sodium antimonate has been converted to antimony pentoxide.

The above prepared antimony pentoxide sol can be converted to a dry powder, for example, by spray drying.

The embodiments of the invention in which an exclusive property or privilege is claimed are defined as follows:

1. A method of preparing a colloidal aqueous sol of antimony pentoxide from a water-insoluble metal antimonate comprising:
    (a) preparing an aqueous slurry of a water-insoluble metal antimonate, and
    (b) passing the aqueous slurry through a fluidized bed containing a cation exchange resin whereby metal antimonate is converted to colloidal antimony pentoxide.

2. The method of claim 1 wherein the aqueous slurry of metal antimonate is recirculated through the fluidized bed containing the cation exchange resin for a length of time sufficient to convert substantially all of the metal antimonate to colloidal antimony pentoxide.

3. A method of preparing a colloidal aqueous sol of antimony pentoxide from sodium antimonate comprising:
    (a) preparing an aqueous slurry of sodium antimonate, and
    (b) passing said slurry through a fluidized bed containing a cation exchange resin whereby sodium antimonate is converted to colloidal antimony pentoxide.

4. The method of claim 3 wherein the aqueous slurry of sodium antimonate is recirculated through the fluidized bed containing the cation exchange resin for a length of time sufficient to convert substantially all of the sodium antimonate to colloidal antimony pentoxide.

* * * * *